Oct. 21, 1941.  M. D. BERGAN  2,260,136
ELECTRICAL GROUNDING CONNECTOR
Filed June 29, 1940  2 Sheets-Sheet 1

INVENTOR.
MARTIN D. BERGAN
James C. Ledbetter
ATTORNEY.

Oct. 21, 1941. M. D. BERGAN 2,260,136
ELECTRICAL GROUNDING CONNECTOR
Filed June 29, 1940 2 Sheets—Sheet 2

INVENTOR.
MARTIN D. BERGAN
BY James C. Ledbetter
ATTORNEY.

Patented Oct. 21, 1941

2,260,136

UNITED STATES PATENT OFFICE 2,260,136

ELECTRICAL GROUNDING CONNECTOR

Martin D. Bergan, Westfield, N. J., assignor to The Thomas & Betts Co., Elizabeth, N. J., a corporation of New Jersey Application June 29, 1940, Serial No. 343,101

4 Claims. (Cl. 174—51)

This invention relates to electrical grounding fittings or clamps for use in connection with wiring raceway systems or assemblies and more particularly to a new and useful electrical grounding connector.

One form of conventional electrical raceway assembly for enclosing and protecting electrical power and lighting service wires and the like usually includes one or more conduits rigidly secured to an electrical outlet or junction box by two nuts. For example, one nut usually is a lock nut abutting the outside wall of the box, while the other nut serves as a bushing which not only abuts the inside wall of the box but also covers the rough and threaded open end or mouth of the conduit where it opens into the box. Thus the bushing provides a smooth protective surface for the wiring insulation to prevent it from being cut or worn when pulling and handling the service wires through the conduit and box parts.

Accordingly, one general form of wiring raceway assembly, referred to herein as an example of standard usage, comprises an electrical outlet or junction box, a conduit, the lock nut and the protective bushing. Ordinarily, the lock nut and threaded bushing are not regarded as establishing an effective electrical ground connection between the conduit and box. The Underwriter's Laboratories requirements as well as many local regulations make essential a grounding connection between the conduit and box, as well as the grounding of all conduits together as one, where more than one conduit enters a box. This invention provides improvements in electrical grounding connectors for carrying into effect these requirements in a simpler and more positive manner than now prevailing in the art.

An object of this invention is to produce a grounding fitting or clamp of simple form, with few parts and convenient to install, which establishes an effective electrical grounding connection between the box and bushing, and hence between the conduit and box.

Likewise, an object is to so form the grounding fitting or clamp that it serves its purpose whether used in connection with single or multiple conduit work, and likewise whether installed on the raceway parts during the installation of the service wiring or after same is completed.

A further object is to produce an electrical grounding connector having simple screw means, say a two-in-one screw feature, which performs the purpose of not only bonding and electrically connecting the box and conduit but also establishing a solderless electrical connection with a grounding jumper wire adapted to connect to ground the box and one or more conduits entering said box.

Another object is to produce a grounding fitting so designed and constructed that it is well adapted to several sizes of conduits as well as several gage sizes of grounding jumper cable wires.

With the foregoing and other objects in view, the invention has relation to the construction and combination of parts, as well as the principle herein explained and shown by the accompanying drawings illustrating one of the preferred forms or examples of the invention with its several uses and advantages, wherein:

Sheet 1 of the drawings shows the invention in its simplest form, the device being installed merely for electrically connecting and grounding a conduit with a box. This type of grounding work shown in Sheet 1, although omitting a grounding wire connection from the box assembly to the ground, is sometimes permitted, in event of which a clamp embodying this invention effectively serves the purpose.

Sheet 2 of the drawings shows the same device as in Sheet 1 but used with a grounding cable or wire connection to ground and hence a more approved and safer form of wiring and raceway work. A solderless connector is combined with the device of Sheet 1 for electrically grounding a box with one or more conduits through a jumper wire adapted to lead to the ground.

Figure 1:
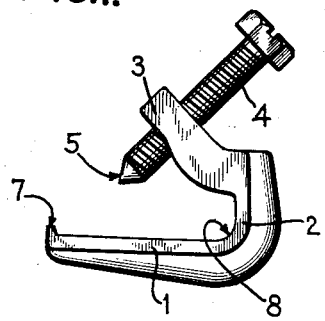
Figures 1, 2 and 3 show the grounding fitting separately from the raceway assembly, in side, front and top elevation. These views show the invention in its simplest form, that is, without the grounding jumper wire and solderless electrical connector forming a part of the fitting shown in Sheet 2.
Figure 2:
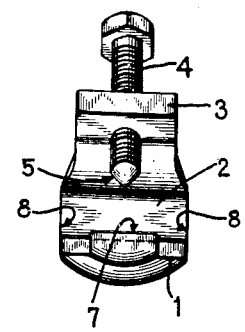
Figure 3:
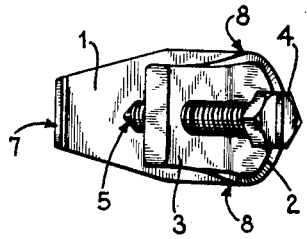

The illustrated example of a typical electrical wiring raceway assembly comprises an electrical junction or outlet box OB with a conduit C anchored thereto by a lock nut N and a threaded bushing B in the usual manner. The bushing B also comprises a nut which is screwed onto the open end or mouth of the conduit C after the latter is introduced into the box OB, whereupon the lock nut N on the outside of the box is screwed up hard against the box wall to complete the rigid assembly of these four parts constituting the conduit and box assembly of the raceway system. The bushing B provides a smooth annular mouth over the cut and threaded conduit C to prevent abrading the wiring insulation.

As understood, good usage and acceptable wiring practice requires more than merely the two nuts N and B abutting both sides of the box wall by which to electrically bond or connect these raceway parts together for grounding purposes. This invention provides means for electrically grounding the raceway assembly without changing the conventional construction of the latter. The electrical service wiring or cable is omitted from the conduits C for clarity, as it is to be understood that the invention relates entirely to bonding and grounding the box and conduit.

The grounding clamp in its simplest form and use comprises two parts, to-wit, a specially designed lug member and a pointed grounding contact screw. The clamp may be said to comprise a V-shaped lug or body member, say in the form of a yoke, or it is of hook-shaped formation. This shape adapts it to straddle the bushed conduit mouth as shown and cover a segmental portion thereof. This yoke-shaped clamping lug has an inside bearing member or arm 1 turned right angularly on its outer end at an apex portion 2 and terminating in an outside end part or arm 3 extending back over and proximate to the part 1 and at an angle therewith. The outer lug 3 is spaced from the inner lug 1 by reason of the portion 2 being widened to form a rectangular union between the diverging integral parts 1 and 3 with space to receive the conduit and bushing therebetween.

A grounding screw 4 with a pointed contact end 5 is operatively threaded into the outer lug part 3, pointed away from the lug portion 2, and is disposed at a suitable angle to the inner lug part 1, say an angle of about 50° or 60° more or less with the member 1 or the axis of the conduit C. By running the screw 4 downwardly toward the bearing member 1, the latter is drawn upwardly toward the screw 4 when its point 5 seats against the rigid raceway assembly and bites or digs thereinto as shown.

The inner part 1 of the V-shaped clamp 2 may be sufficiently long to extend inwardly of the conduit to a point proximate or just beyond the intersection of the axis of the screw 4 therewith. The lug portion 1 inside the conduit C is straight and flat, and is smooth on its exposed surface and of thin formation with adequate width for stock so as not to interfere with the service wiring (not shown) in the conduit C. The inner lug arm 1 is wide and thin so as to hug the conduit wall; it must not take up the space occupied by the electrical wiring in the conduit.

The inner extremity or tip of the lug part 1 is turned upwardly toward the lug part 3 in the form of a biting ridge or contact point 7 for the purpose of biting through the scale or finished surface of the inside wall of the conduit, so as to establish therewith an effective electrical bonding contact. In this connection, the lug portion 1 has a plane or flat surface facing its counterpart 3 and thus when installed in the conduit C has its outer end or angle portion 2 so arranged as to present its spaced edges at spaced points 8 in pressure engagement with the inner rim of the bushing B. Thus the bearing points 7, 8 and 8 are in a plane adapted to seat and bond with electrical contact against the conduit and bushing.

The result of the foregoing is that the lug part 1 bears against the inside of the conduit and bushing at three spaced points or places 7, 8 and 8. In other words, the three bearing means 7, 8 and 8 space the lug 1 as a whole slightly from the inner wall of the conduit which causes the bearing points 7 and 8 to depress or cut and bite into the conduit and make effective electrical connection therewith through the scale, plating or paint, if any, inside the conduit.

Figure 4:
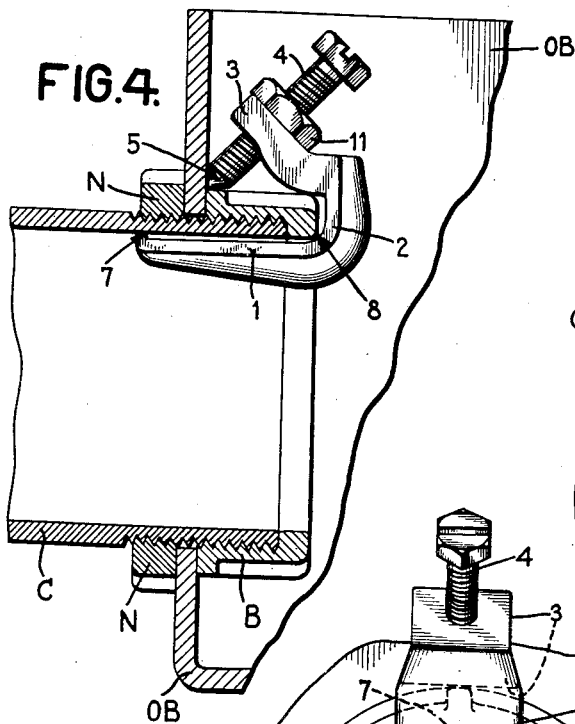
Figure 4 shows a longitudinal section of a wiring raceway assembly (conduit, box and nuts) with the grounding clamp in elevation and installed in service position.
Figure 5:
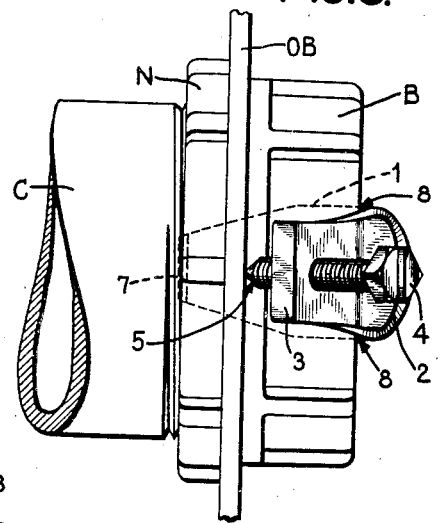
Figure 5 shows a plan view of Figure 4.
Figure 6:
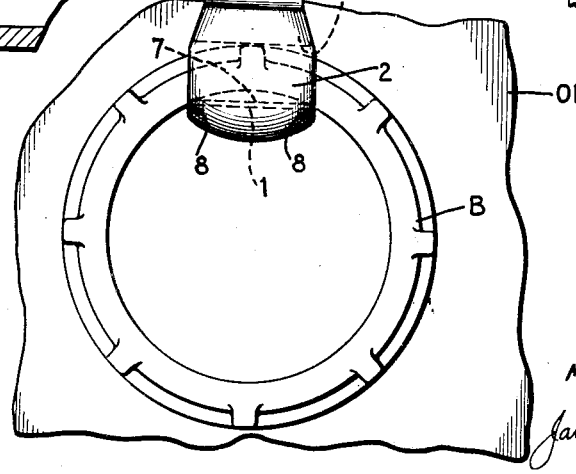
Figure 6 shows a front end view of Figures 4 and 5, looking from inside the box into the open end or bushed mouth of the conduit where it enters the box.
Figure 7:
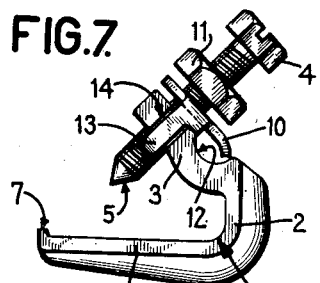
Figures 7, 8 and 9 show side, front and top views of the grounding fitting with its jumper grounding wire and screw clamp means, constituting a solderless electrical connector, applied to the grounding fitting and more particularly for use in connection with multiple conduit assemblies. However, the grounding wire and solderless connector may be used for the single conduit work shown in Sheet 1.
Figure 8:
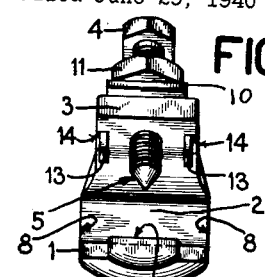
Figure 9:
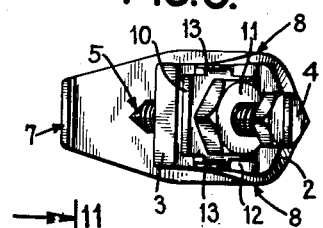

The assembly of the device or its installation on the raceway system is shown in Figure 4 and so on, where the clamp 2 straddles a segmental portion of the bushed mouth of the conduit. The axis of the screw 4 is so directed that when screwed inwardly its point 5 first seats and digs into the far or rear end of the bushing B and almost simultaneously into the wall of the box OB. The axis of the screw 4 is directed at about 55 degrees more or less, in relation with the axis of the conduit C, in order that the screw point 5 may establish a pressure seating engagement in the right-angle or abutting corner where the box wall OB and bushing B bear against each other under the pressure of the outside lock nut N.

Accordingly, it is important to note that the axis of the grounding screw 4 is not directed at 45° to center and equalize its pressure in the 90° corner defined by the box wall and bushing, but preferably digs first into the periphery of the bushing edge and then into the box wall. Thus the bushing is jammed the harder into electrical bonding contact with the box wall and no tendency exists for the screw point 5 to pry back on the bushing to separate it from the box and thus lead to the fault of separating the parts. On the contrary, the grounding screw 4 jams the bushing nut B toward the box wall OB and the latter toward the outside lock nut N. This characteristic results in locking the four parts of the raceway (conduit, box, lock nut and bushing) together in a rigid and bonded assembly.

If desired, a lock nut 11 (Figure 4) may be used on the grounding screw 4 and set hard against the lug 3 to lock said grounding screw 4 against loosening; however, the lock nut 11 is not necessarily needed for such purpose since the buried point 5 and the tension of the parts 2 and 4 sprung under compression prevent loosening. The important function of this nut 11 is hereinafter explained in connection with Sheet 2 of the drawings.

According to the foregoing, it will be seen that all three members or parts of the raceway assembly, comprising the conduit C, the bushing B and the box OB, are electrically bonded together by the simple two-part grounding fitting 2, 4. Likewise, the pointed screw 4 locks the bushing on the conduit and against the box to prevent the bushing from backing off and becoming loose due to any cause as a consequence of long use. The foregoing functions and advantages also apply to the invention when a grounding wire is applied thereto as next described.

Figure 12:
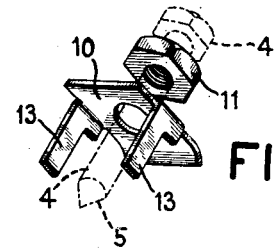
Figure 12 is a perspective view of a wire clamping plate and screw nut used in combination with the grounding screw shown on Sheet 1 when it is desired to install the bounding ground wire to make the complete installation shown on Sheet 2.

Sheet 2 of the drawings shows the same grounding clamp as heretofore explained and with the same reference numbers applied thereto, but adding a wire connector (Figure 12) by which a grounding wire W is electrically connected with one or more conduits and the box so as to ground all parts of the raceway assembly to the earth, as in the more acceptable wiring practice. The upper lug 3 and screw 4 is fitted with suitable solderless wire connecting means by which the electrical grounding cable W, sometimes called a jumper wire, can very conveniently be run from one grounding clamp 2 to another clamp and so on in a box until all these raceway parts are electrically connected together for grounding purposes.

The wire connector (Figure 12) comprises a clamp plate 10 (say of brass) mounted freely on the grounding screw 4 which has a screw nut 11 threaded thereon. Also the outer lug 3 may be provided with a wire receiving recess or channelled seat 12 under the clamp plate 10. This wire seat 12 is located adjacent the straddling turn 2 of the clamp body. The electrical clamp plate 10 is forced into contact with the stranded grounding cable wire W, thusly anchoring and electrically connecting it to the grounding clamp. If desired a pair of parallel arms 13, integral with the wire clamping plate 10, may be slidably confined in grooves 14 made in the lug 3 for guiding this clamping plate up and down in operative relation to the bare wire end W and its recessed seat 12.

It will be noted that the wire seat 12 will receive a number of different gages or sizes of ground wires W. Likewise, the ground clamp 1, 3 is also adapted to straddle and fit the segmental portion of a number of different sizes of conduits C. Consequently, grounding connectors embodying this invention are somewhat universal in their application to raceway part sizes. In other words, a minimum number of sizes of devices may be produced and carried in stock to supply the need arising due to different size conduits C and ground wires W. The recessed wire seat 12 in a given-size device is large enough to receive the maximum gage ground wire W required to be used with the maximum size conduit which said given-size device will receive. This is an important feature of the invention.

Figure 10:
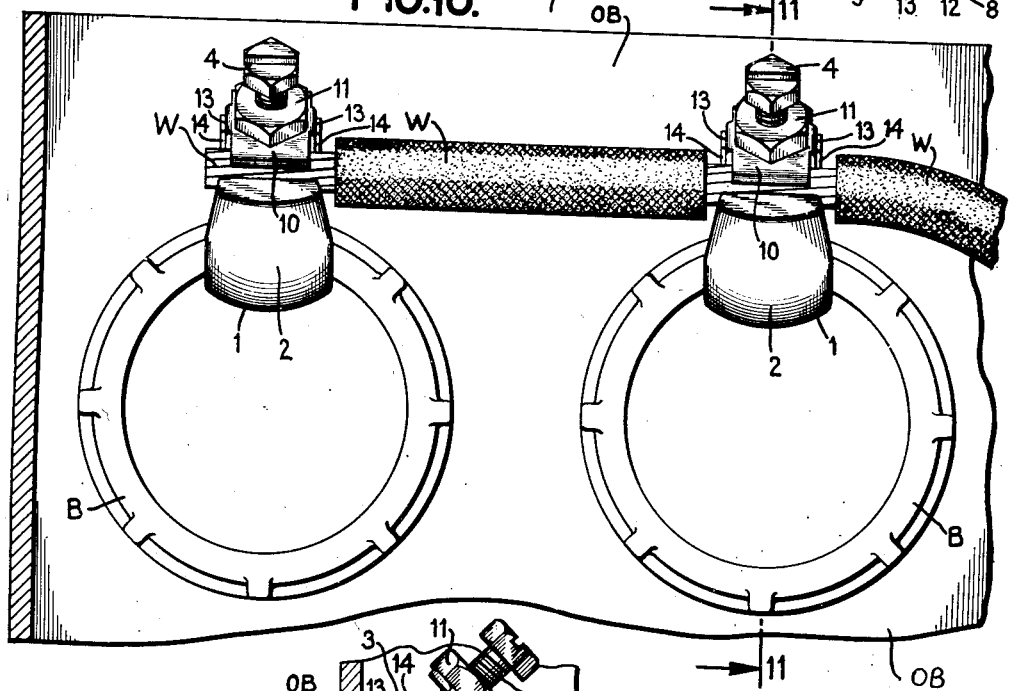
Figure 10 shows a view looking from inside the box into the open ends or bushed mouths of the several conduits anchored in the box, together with the grounding jumper wire connection extending from one conduit to the other.
Figure 11:
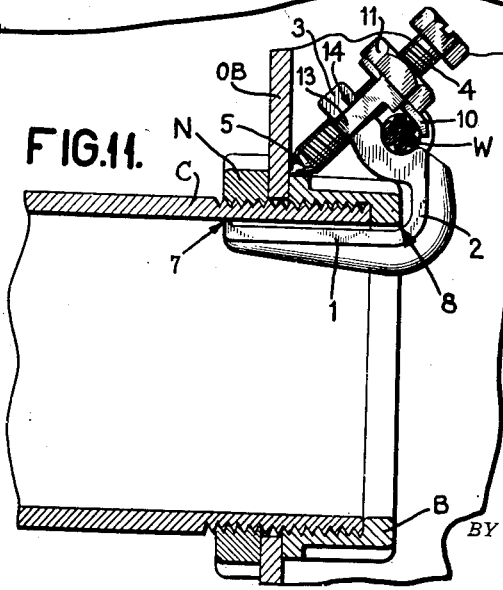
Figure 11 shows a section on the line 11—11 of Figure 10 with the grounding fitting in elevation and an end view of the wire electrically connected therewith.

As shown in Figure 10, a single grounding wire W is usually a stranded cable which jumps or leads from one conduit to another in a box until said box and all conduits are electrically connected, whereupon the free end of the wire W is led to ground through another conduit (not shown) or in any approved manner. In this way, the grounding clamp 2 is useful in its simplest application as shown in Sheet 1, as well as for the more approved grounding wire W installation for one or more conduits as shown in Sheet 2.

From the foregoing it is seen that the simple wire clamp plate 10 and its screw nut 11 (Figure 12) constitute an attachment for use in combination with the grounding screw 4 by which to install the bonding jumper wire W for grounding purposes. Although another threaded hole could be provided in the clamp lug and a second screw provided for the wire W, it is found that the screw nut 11 mounted on the grounding screw 4 is preferred by way of reducing the number of parts and is convenient for installation.

The manufacture of this grounding fitting preferably provide the lug body 2 with the ground wire recess 12 and guide grooves 14, even though not shown in Sheet 1. It is then simple enough for the mechanic on the job to use the fitting for either type of work, with or without the brass clamp 10 and nut 11 as an attachment for the bonding jumper wire W.

Note also the simplicity of the installation of the device inside the electrical box OB. Since this grounding clamp is in effect an independent part, that is, it is not an essential structural part of the box and conduit assembly, it follows that the raceway parts and the service wiring therein (not shown) can be completed in all respects. Thereafter the grounding installation is made by attaching the clamp 2 as a finished job as in Sheet 1. Long thereafter, if regulations compel the addition of the more approved method in the use of the grounding wire W, the latter can be added without interfering with the previous service wiring job.

It is important to observe that the grounding clamp 2, as well as its jumper wire bonding attachment parts W, 10 and 11, are so mounted on the raceway assembly that they are out of way of the service wiring in the box. In other words, the clamp 2 and wire W hug the box wall above the conduits and are not down in the range of the open ends of the conduits where the service wires enter the box. This makes for convenience and rapidity of installation.

This invention is presented to fill a need for improvements in an electrical grounding connector. It is understood that various modifications in structure, as well as changes in mode of operation, assembly, and manner of use, may and often do occur to those skilled in the art. This is especially true after benefiting from the teachings of an invention or becoming aware of its inherent utility and advantages. Hence, it will be understood that this disclosure is illustrative of what is regarded at this time as preferred means for embodying the invention in useful form.

What is claimed is:

1. The combination with an electrical box and bushed conduit assembly, wherein a number of conduits enter said box and are anchored therein by lock nuts and bushing nuts, a grounding clamp within the box and mounted on each bushed conduit, a grounding screw operatively carried by each grounding clamp and disposed in angular relation to the conduit and screwed into pressure engagement with the box wall as well as the bushing nut where these two members bear against each other, the grounding screw being so arranged as to force the bushing nut toward the box and the latter toward the lock nut, wire connector means mounted on and operated by each grounding screw, and a jumper grounding cable in the box joined to each clamp by the wire connector means.

2. The combination with an electrical wiring-raceway assembly comprising a conduit projecting through a box wall and secured therein by a lock nut against the outside of the box together with a threaded bushing having its inner end against the inside of said box, of a yoke-like grounding clamp straddling the bushed conduit with one end of said clamp seated inside the conduit and the other end extending outside thereof, and a screw threaded through the outside end of the clamp and disposed at angle in order that the extremity of said screw seats under pressure not only against the rear end of the bushing but also against the box wall.

3. The combination with an electrical wiring-raceway assembly comprising a conduit projecting through a box wall and secured therein by a lock nut against the outside of the box together with a threaded bushing having its inner end against the inside of said box, of a grounding fitting mounted inside the box and astride the bushed mouth of the conduit where the latter opens into said box, one portion of the fitting reaching into the conduit and seated in electrically bonded engagement thereagainst, another portion of the fitting reaching outwardly around the bushed mouth of the conduit toward the box wall, a screw threaded thru this latter portion at an angle to the axis of the conduit; and a point on the end of the screw which when tightened initially engages the bushing near its rear end, and as said screw is further tightened the point thereof progressively digs into said bushing and while still engaging same advances beyond the rear edge thereof and digs into the box wall.

4. The combination with an electrical wiring-raceway assembly comprising a conduit projecting through a box wall and secured therein by a lock nut against the outside of said box together with a threaded bushing having its inner end against the inside of said box, of a two-arm grounding fitting mounted inside the box and disposed astride the bushed mouth of the conduit, one arm being of straight formation and reaching inwardly parallel with the inside wall of the conduit to hug and electrically bond thereagainst and disposed out of the way of the usual wiring therein, another arm reaching outwardly around the bushed mouth of the conduit and extending toward the box wall, a screw threaded thru this latter arm at an angle to the straight arm and seated against the corner intersection of the inside wall of the box and the rear end of the bushing whereby the end of the screw electrically bonds simultaneously against both the bushing and the box wall, which not only serves to connect the box as well as the lock nut and the bushing into one unified electrically-grounded assembly, but likewise forces the box wall toward the lock nut, and simultaneously locks the bushing against a turning or loosening tendency.

MARTIN D. BERGAN.